United States Patent

Mikielski et al.

[11] Patent Number: 5,948,547
[45] Date of Patent: Sep. 7, 1999

[54] COMPOSITION BASED ON STATISTICAL PROPYLENE COPOLYMERS, PROCESS FOR THEIR MANUFACTURE AND MULTILAYER HEAT-SEALABLE SHEETS CONTAINING THEM

[75] Inventors: Raymond Mikielski, La Hulpe; Veerle Deblauwe, Londerzeel; Mathieu Wilkin, Wemmel, all of Belgium

[73] Assignee: Solvay Polyolefins-Europe-Belgium, Brussels, Belgium

[21] Appl. No.: 08/763,443

[22] Filed: Dec. 11, 1996

[30] Foreign Application Priority Data

Dec. 22, 1995 [BE] Belgium .................. 09501068

[51] Int. Cl.$^6$ ............ C08L 23/10; C08L 23/18; B32B 27/00; B32B 27/08
[52] U.S. Cl. ............................ 428/516; 525/240
[58] Field of Search .................... 525/240; 428/516

[56] References Cited

U.S. PATENT DOCUMENTS

| 4,211,852 | 7/1980 | Matsuda et al. . |
| 5,166,268 | 11/1992 | Ficker . |
| 5,218,046 | 6/1993 | Audureau et al. . |
| 5,623,021 | 4/1997 | Pelliconi et al. ............... 525/240 |
| 5,773,516 | 6/1998 | Huffer et al. ................... 525/242 |

FOREIGN PATENT DOCUMENTS

| 0252718 | 1/1988 | European Pat. Off. . |
| 0263718 | 4/1992 | European Pat. Off. . |
| 0483523 | 5/1992 | European Pat. Off. . |
| 0483675 | 5/1992 | European Pat. Off. . |
| 0663422 | 7/1995 | European Pat. Off. . |
| 0674991 | 10/1995 | European Pat. Off. . |
| 4109368 | 9/1992 | Germany . |
| 1569112 | 6/1980 | United Kingdom . |

OTHER PUBLICATIONS

"Food Drug Cosmetic Law Reports"; Apr. 18, 1994; instruction 57,038.2, paragraph 177.1520.

*Primary Examiner*—Jeffrey C. Mullis
*Attorney, Agent, or Firm*—Venable; George H. Spencer; John W. Schneller

[57] ABSTRACT

Compositions based on propylene polymers (compositions (C)) comprising:
  from 68 to 80% by weight of a statistical propylene copolymer (copolymer (A)) which contains from 12 to 20% by weight of units derived from 1-butene and from 0 to 2% by weight of units derived from ethylene, and
  from 20 to 32% by weight of a statistical propylene copolymer (copolymer (B)) which contains from 0 to 15% by weight of units derived from 1-butene and from 1 to 8% by weight of units derived from ethylene.

22 Claims, No Drawings

COMPOSITION BASED ON STATISTICAL PROPYLENE COPOLYMERS, PROCESS FOR THEIR MANUFACTURE AND MULTILAYER HEAT-SEALABLE SHEETS CONTAINING THEM

The present invention relates to compositions based on statistical propylene copolymers. It more particularly relates to compositions exhibiting both a relatively high melting point and a relatively low sealing temperature containing two statistical propylene copolymers of different composition. The present invention also relates to a process for the manufacture of these compositions. Finally, it relates to multilayer heat-sealable sheets in which the said compositions constitute the heat-sealable layer.

It is known to use statistical propylene copolymers containing a few % by weight of ethylene for the manufacture of the heat-sealable layers (also known as "sealing layers") of multilayer sheets for packaging, the central layer of which is based on a crystalline propylene polymer, which are generally biaxially oriented (known as "BOPP films"). In order to lower the sealing temperature of these copolymers and to improve the optical properties of the sheets, statistical copolymers containing, in addition to propylene and ethylene, a third comonomer which is preferably 1-butene can be substituted for them.

One disadvantage of these copolymers is the fact that, at a given sealing temperature (hereinafter known more concisely as ST), the melting temperature (hereinafter known more concisely as MT) is too low for use on certain machines for the manufacture of sheets, thus resulting in problems of adhesion to the rollers of these machines.

Attempts have been made to overcome these disadvantages by using compositions containing two propylene copolymers containing variable amounts of monomer units derived from ethylene and/or 1-butene.

Mention may be made, as examples of documents describing such compositions, of:

the document EP-B-0,263,718, which describes weakly crystalline compositions based on propylene polymers comprising:
60 to 95% by weight of a statistical copolymer composed of 97 to 86 mol % of propylene, of 0.5 to 6 mol % of ethylene and of 2 to 13 mol % of a $C_4$–$C_{20}$ α-olefin, the molar ratio of the α-olefin to the sum of the ethylene and α-olefin which are incorporated being from 0.3 to 0.9;
40 to 5% by weight of a statistical copolymer composed of 10 to 90 mol % of propylene and of 90 to 10 mol % of a $C_4$–$C_{20}$ α-olefin;

the document EP-A-0,483,523, which describes compositions based on crystalline propylene polymers comprising (percentages by weight)
30 to 65% of a copolymer of propylene and a $C_4$–$C_8$ α-olefin containing from 98 to 80% of propylene, and
70 to 35% of a copolymer of propylene and ethylene and, optionally, 2 to 10% of a $C_4$–$C_8$ α-olefin, the said copolymer containing 2 to 10% of ethylene in the absence of the $C_4$–$C_8$ α-olefin and 0.5 to 5% of ethylene in the presence of the $C_4$–$C_8$ α-olefin;

the document EP-A-0,674,991, which describes compositions which are more suitable for printing with ink than those described in the preceding document and which comprise (percentages by weight):
20 to 60% of a copolymer of propylene and ethylene containing 1 to 5% of ethylene;
80 to 40% of a copolymer of propylene with ethylene and a $C_4$–$C_8$ α-olefin, the ethylene content of which is between 1 and 5% and the $C_4$–$C_8$ α-olefin content of which is between 6 and 15%. The total ethylene and α-olefin contents of the compositions are between 1 and 5% and between 2.4 and 12% respectively.

However, the compositions described in these documents do not simultaneously exhibit an optimum compromise between the MT and the ST and a content of fractions which are soluble in organic solvents, such as xylene and hexane, which is sufficiently low. For this reason, these compositions can exhibit problems when they are employed for the shaping of sheets, such as problems of adhesion to the rollers of the machines used for this operation or problems related to the emission of fumes during this operation.

In addition, the sheets obtained by means of these compositions do not always exhibit both optimum optical properties (gloss and transparency) and excellent mechanical properties.

In certain cases, a migration of the possible additives to the surface of the sheets is additionally observed, which migration prevents these compositions from being used for food packaging. Finally, their suitability for printing is not always satisfactory.

Specific compositions based on statistical propylene copolymers containing monomer units derived from ethylene and 1-butene have now been found which make it possible satisfactorily to solve all the problems listed above.

To this end, the present invention mainly relates to compositions based on propylene polymers (compositions (C)) comprising:
from 68 to 80% by weight of a statistical propylene copolymer (copolymer (A)) which contains from 12 to 20% by weight of units derived from 1-butene and from 0 to 2% by weight of units derived from ethylene, and
from 32 to 20% by weight of a statistical propylene copolymer (copolymer (B)) which contains from 0 to 15% by weight of units derived from 1-butene and from 1 to 8% by weight of units derived from ethylene, the composition of the two copolymers (A) and (B) being different.

In order to simplify the description, the terms "units derived from propylene", "units derived from 1-butene" and "units derived from ethylene" will hereinafter be replaced by the abbreviations "C3", "C4" and "C2" respectively.

It is generally observed that compositions (C) containing higher amounts of copolymer (A) result in adhesion to the drawing rollers of the machines for the manufacture of the sheets whereas lower amounts of copolymer (A) result in compositions (C) with an excessively high ST.

The copolymers (A) which can be used in the compositions according to the invention result in a satisfactory ST. In addition, they can be obtained under technically and economically acceptable polymerization conditions. Compositions (C) containing higher C4 contents in the copolymer (B) result in an excessively low MT. Lower C4 contents in the said copolymer (B) result in an excessively high ST.

Higher C2 contents in the copolymer (B) result in an excessively low MT and lower C2 contents in the said copolymer (B) result in an excessively high ST.

Advantageously, the copolymer (A) content of the compositions according to the invention is at most 77% by weight and more particularly 75% by weight. Compositions which comprise approximately 70% by weight of copolymers (A) are highly suitable.

The copolymer (A) is most often such that the amount of C4 is at least 13% by weight with respect to the said copolymer (A). In addition, this amount is preferably at most 18% by weight.

The copolymers (A) used according to the invention can also optionally contain C2. Preferably, the amount of C2 contained in the copolymers (A) is at least 0.3% by weight. Good results are obtained when this amount is at most 0.9% by weight. This low C2 content does not fundamentally modify the desired MT/ST compromise, while improving the suitability for printing of the sheets manufactured from the compositions (C). It has been noticed surprisingly that, when the copolymer (A) contains ethylene, it is preferable for the C4 content of this copolymer (A) not to exceed 15% by weight.

The compositions (C) according to the invention also comprise from 20 to 32% by weight of a copolymer (B).

The amount of copolymer (B) is preferably at least 23% by weight and more particularly at least 25% by weight. An amount of copolymer (B) of approximately 30% by weight is highly suitable.

The copolymer (B) preferably contains at least 3% by weight of C4. Advantageously, this amount of C4 is at most 15% by weight. The copolymer (B), in addition, preferably contains at least 1.5% by weight of C2. Good results are obtained when the amount of C2 is at most 5% by weight.

Preferably, the compositions according to the invention are essentially composed of the copolymers (A) and (B). Preferably as well, the copolymers (A) and (B) only contain monomer units derived from propylene, 1-butene and/or ethylene.

Compositions (C) according to the invention which give particularly good results comprise:
- from 68 to 75% by weight of a copolymer (A) containing from 12 to 15% by weight of monomer units derived from 1-butene and from 0 to 1% by weight of monomer units derived from ethylene, and
- from 32 to 25% by weight of a copolymer (B) containing from 10 to 15% by weight of monomer units derived from 1-butene and from 2 to 5% by weight of monomer units derived from ethylene.

The compositions (C) according to the invention generally exhibit a melt flow index (MFI), measured according to ASTM Standard D 1238 (230° C.; load: 2.16 kg), of 1 to 15 g/10 min, preferably of 2 to 10 g/10 min.

The MT of the compositions (C) according to the invention, measured by differential scanning calorimetry according to ASTM Standard D 3418, is generally at least 105° C. and preferably at least 120° C. The MT of these compositions is most often at most 150° C. and more particularly at most 140° C. Compositions (C) in which the MT is from 125 to 135° C. are very particularly preferred because they allow easy operation on machines for the manufacture of BOPP films, with the absence of adhesion to the drawing rollers in the lengthwise direction.

The compositions (C) according to the invention exhibit both a high MT and a low ST. The ST of the compositions (C) according to the invention is generally at most 125° C. and more particularly at most 120° C. The ST of the compositions according to the invention is most often at least 100 and more particularly at least 105° C. The ST is determined as follows: the untreated faces of two coextruded and biaxially oriented sheets with a thickness of 22 $\mu$m are placed between the jaws of a Toyo Seiki sealing device with a heated jaw. A pressure of 3 bars is applied for one second. After cooling, a tensile test at 100 mm/min is carried out. The ST is the temperature, expressed in °C., at which the weld exhibits a strength of 100 g/cm. The coextruded biaxially oriented sheets are composed of a central layer of propylene homopolymer (MFI: 2.8 g/10 min) with a thickness of 20 $\mu$m and of two outer layers of the composition (C) according to the invention with a thickness of 1 $\mu$m. To manufacture these sheets, a draw ratio in the lengthwise direction of 5 is applied and a draw ratio in the transverse direction of 9 is applied.

According to the present invention, the soluble fraction, hereinafter known more simply as HSF, is measured as indicated in "Food Drug Cosmetic Law Reports" of Apr. 18, 1994, instruction 57,038.2; paragraph 177.1520 and is expressed as percentage by weight of fractions soluble in n-hexane at 50° C. with respect to the whole of the composition. The HSF of the composition (C) is preferably less than or equal to 20%. The HSF of the compositions (C) is most often greater than or equal to 1% by weight and less than or equal to 15%. Most often, the HSF is greater than or equal to 2. In the case where the multilayer heat-sealable sheets have to be used for packaging foodstuffs, it is very particularly preferred for the HSF to be less than or equal to 5.5%. The compositions (C) giving particularly good results described above in addition advantageously exhibit, simultaneously, a melting temperature such that 125° C.$\leq$MT$\leq$135° C., a soluble fraction of at most 5.5% and a sealing temperature such that 110° C.$\leq$ST$\leq$120° C.

The compositions (C) according to the invention exhibit, besides the advantages described above, the property of giving rise to seals or welds with a particularly high resistance to heat, commonly known as "hot tack".

The invention also relates to a process for the manufacture of the compositions (C). According to a first alternative form, the compositions according to the invention can be obtained by preparing the copolymer (A) and the copolymer (B) separately and by mixing these copolymers according to any technique known for this purpose.

The copolymers (A) and (B) can be prepared in a known way by copolymerization of propylene with 1-butene and/or with ethylene. The principle of these copolymerizations is known to the person skilled in the art.

The copolymers (A) and (B) are preferably obtained by gas-phase polymerization. Such a process is preferred because it makes it possible easily to incorporate large amounts of 1-butene and/or ethylene. These copolymerizations can be carried out continuously or non-continuously or by a combination of the two methods. The copolymers (A) and (B) can be mixed, for example, by melt mixing in an internal or external mixer. This mixing is preferably carried out in a mixer of the extruder type.

According to a particularly advantageous alternative form, the compositions according to the present invention are prepared by successive copolymerizations, one of the copolymers being prepared during a first stage and the other copolymer being prepared, in the presence of the first, during a subsequent polymerization stage. Each of these stages can be carried out in the same polymerization mixture or in different polymerization mixtures. Preferably, the copolymer (A) is first prepared and then the copolymer (B) is prepared in the presence of the copolymer (A) resulting from the first stage. A particularly preferred method for the preparation of the composition (C) comprises the successive syntheses of the copolymer (A) and then of the copolymer (B) in the presence of the copolymer (A) by gas-phase polymerization in successive interconnected reactors operating as stirred beds or preferably as fluidized beds.

The copolymers (A) and (B) can be obtained by means of any known sufficiently active and productive Ziegler-Natta catalytic system which makes it possible to polymerize propylene in a sufficiently stereospecific form and which can incorporate, in the polymer, the required amounts of 1-butene and/or ethylene.

The preferred catalytic systems for preparing the compositions according to the invention comprise:

a catalytic solid comprising magnesium, titanium and chlorine as essential components, an organoaluminium compound, preferably a trialkylaluminium, very particularly triethylaluminium, an electron-donating compound (external electron-donator) chosen from aromatic carboxylic acid esters and alkoxysilanes of formula $R^1{}_n Si(OR^2)_{4-n}$ in which $R^1$ represents a hydrocarbon group containing from 1 to 12 carbon atoms, $R^2$ represents a hydrocarbon group containing from 1 to 8 carbon atoms and n is 1, 2 or 3.

The aromatic carboxylic acid esters preferably used as external electrondonator are alkyl and alkoxy-alkyl benzoates, very particularly p-ethoxyethylbenzoate. Alkylalkoxy- and cycloalkylalkoxysilanes, very particularly diisobutyldimethoxysilane, n-propyltri-methoxysilane, dicyclopentyldimethoxysilane and cyclohexylmethyldimethoxysilane, are preferred alkoxysilanes as external electrondonator.

The catalytic solids which can be used according to the invention are well known to the person skilled in the art. They most often contain an electron-donating compound (internal electrondonator) chosen from aromatic carboxylic acid mono- and diesters, preferably from dialkyl phthalates, very particularly diisobutyl phthalate. The catalytic solids which can be used according to the present invention can also contain more or less large amounts of preformed polymers. The catalytic solid can be prepolymerized, for example, during the synthesis of the said solid or during a polymerization stage directly preceding the manufacture of the compositions according to the present invention. Catalytic solids which are highly suitable for the manufacture of the compositions (C) according to the invention are the catalytic solids sold under the name SHAC by the company Shell and under the name THC by the company Toho Titanium.

The various constituents of the catalytic system are generally made use of so that the atomic ratio of the aluminium of the organoaluminium compound to the titanium of the catalytic solid is from 3 to 300, preferably from 10 to 250 and very particularly from 15 to 70. In addition, the molar ratio of the aluminium of the organoaluminium compound to the electron-donating compound is generally from 0.5 to 60, preferably from 1 to 50 and very particularly from 2 to 30.

The other general polymerization conditions are well known to the person skilled in the art. The temperature is generally from 20 to 150° C., preferably from 40 to 95° C. and very particularly from 50 to 75° C. The polymerization is generally carried out at a pressure greater than atmospheric pressure, preferably from 10 to $50 \times 10^5$ Pa.

The average molecular mass of the copolymers formed can be adjusted by the addition of one or a number of known agents for adjusting the molecular mass, such as hydrogen, diethylzinc, alcohols, ethers and alkyl halides. Hydrogen is the most commonly used.

The required amounts of monomers and of agent for adjusting the molecular mass can be introduced continuously or non-continuously into the polymerization mixture.

The composition (C) can optionally be subjected to one or a number of known treatments with water, an alcohol and/or a hydrocarbon diluent in order to remove the catalytic residues and/or the low molecular weight fractions.

The compositions (C) according to the present invention can contain additives known for improving the properties thereof. These additives are, for example, stabilizers, neutralizing agents, lubricants, slip-promoting agents or antistatic agents. The MFI of the compositions (C) can also, if necessary, be adjusted by mixing, preferably in the molten state, with a peroxide.

As mentioned above, the compositions (C) according to the invention can be used for the manufacture of heat-sealable sheets and more particularly for the manufacture of multilayer sheets for which they constitute the sealing layer or layers.

The multilayer sheets generally contain a base layer which can be composed of any polymeric material, generally of a crystalline α-olefin polymer. Preferably, the base sheet is substantially composed of a crystalline propylene polymer. It most often exhibits an intrinsic viscosity [η], measured in decalin at 135° C., of 1.5 to 4 dl/g. Its isotacticity is preferably such that its fraction which is insoluble in refluxing heptane is greater than 85% by weight and more particularly greater than 95% by weight. This crystalline propylene polymer can also be a copolymer of propylene, ethylene and/or 1-butene generally containing less than 8% by weight of these comonomers, preferably less than 5% by weight.

The multilayer sheets according to the invention can be obtained:

by causing a preshaped base sheet and one or a number of sheets preshaped from the composition (C) to adhere to one another by pressing between heated rollers;

by coating a base sheet by means of a solution or a dispersion of the composition (C) in an organic solvent, in order to laminate the composition (C) on the base sheet;

by extruding a layer of the molten composition (C), in order to laminate it on the base sheet;

by extruding the composition (C) and the base sheet separately and by joining the molten extrudates via a common die.

The compositions (C) according to the invention are particularly well suited to the preparation of multilayer sheets according to the last method.

The thickness of the multilayer sheets according to the invention is generally from 5 to 300 μm, preferably from 10 to 170 μm. The thickness of the sealing layer(s) based on the composition (C) is generally from 0.1 to 50 μm, preferably from 0.5 to 30 μm. The thickness of the base sheet is generally from 5 to 200 μm, preferably from 10 to 70 μm.

The multilayer sheets according to the invention can be used without being drawn. Preferably, they are drawn monoaxially and more particularly biaxially, for the purpose of their orientation, after coating the base sheet with the layer or layers of composition (C). This drawing can be carried out according to one of the known methods below:

the multilayer sheet obtained by coextrusion, through a common die, of the composition (C) and the base sheet is drawn biaxially;

a layer of the composition (C) is extruded over a preformed base sheet and the multilayer sheet thus obtained is drawn biaxially;

a base sheet is drawn beforehand monoaxially, while hot, in the lengthwise direction ("machine" direction (MD)) by means of a series of rollers, including a metal roller, a layer of the composition (C) is extruded over this sheet, which has been monoaxially drawn in this way, and the multilayer sheet thus obtained is drawn in the transverse direction (TD).

It is observed, surprisingly, that the compositions (C) according to the invention do not result in problems of adhesion to the rollers when the first two drawing methods are employed.

The multilayer sheets thus obtained are particularly appropriate for all packaging applications.

The following examples serve to illustrate the invention. In these examples, the MFI, MT, ST and HSF values are measured as described above. The C4 content of the copolymers (A) and (B) is determined by Fourier transform IR spectrometry, by using the absorption band at 767 $cm^{-1}$, with respect to a pressed film of 200 $\mu m$ and is expressed as % by weight. The C2 content is determined by the same method from the absorption bands at 733 $cm^{-1}$ and 720 $cm^{-1}$ and is expressed as % by weight. The C3 content is determined by the mass balance and is also expressed as % by weight.

Example 1

The preparation is carried out as follows of a composition (C) comprising (percentages by weight): 75% of a copolymer (A) and 25% of a copolymer (B). The copolymer (A) contains 86.5% of C3 and 13.5% of C4 and the copolymer (B) contains 84.3% of C3, 11% of C4 and 4.7% of C2.

The total respective contents of C4 and C2 in the composition (C) are 13 and 1.3%.

Each of the copolymers (A) and (B) is prepared successively in two fluidized bed reactors connected in series and operating continuously and each equipped with a gas distribution grid. A gas flow containing nitrogen, propylene, 1-butene and hydrogen (and ethylene in the second reactor) is made to move through these reactors, via a compressor, at a stable stationary concentration.

The molar ratios (mol/mol) of the constituents of the gas flow in the first reactor are:

hydrogen/propylene: 0.011;

1-butene/propylene: 0.19.

The molar ratios (mol/mol) of the constituents of the gas flow in the second reactor are:

hydrogen/propylene: 0.028;

ethylene/propylene: 0.029;

1-butene/propylene: 0.17.

The total pressure in the first reactor is adjusted to 36 bar and in the second to 22 bar. The temperature is adjusted to 65° C. in the two reactors. The gas flow passes through the fluid bed of the first reactor at a velocity of 0.31 m/s and the fluid bed of the second reactor at a velocity of 0.48 m/s. The particles exiting from the first reactor are introduced into the second after degassing under a nitrogen atmosphere in an airlock and repressurization.

The catalytic system, introduced into the first reactor, contains:

a catalytic solid containing magnesium, titanium, chlorine and an electrondonator, sold by Shell under the name SHAC 201, triethylaluminium (TEAL), and n-propyltrimethoxysilane.

The atomic ratio of the aluminium of the TEAL to the titanium of the catalytic solid is 70; the atomic ratio of the aluminium of the TEAL to the silicon of the silane is 5.

The mean residence time of the copolymer particles in each reactor is approximately 1.8 hours.

The composition (C) obtained exhibits the following characteristics:

MFI (g/10 min): 4.9;

MT (°C.): 130

ST (°C.): 117

HSF (weight %): 4.5

Example 2R

This example is given by way of comparison.

The preparation is carried out, in the first of the reactors mentioned in Example 1 and according to the general conditions mentioned in this example, of a composition comprising only a single copolymer containing (% by weight):

91% of C3;

7% of C4;

2% of C2.

This composition exhibits the following characteristics:

MFI (g/10 min): 5

MT (°C.): 125.5

ST (°C.): 121.

This composition results in problems of adhesion to the rollers of the machines used for the processing thereof.

Example 3R

This example is given by way of comparison.

The preparation is carried out, in the first of the reactors mentioned in Example 1 and according to the general conditions mentioned in this example, of a composition comprising only a single copolymer containing (% by weight):

81.4% of C3;

18% of C4;

0.6% of C2.

This composition exhibits the following characteristics:

MFI (g/10 min): 5

MT (°C.): 115

ST (°C.): 103.

This composition results in problems of adhesion during its use as sealing layer for the manufacture of multilayer heat-sealable sheets.

Examples 4 to 7 (according to the invention)

The compositions (C) of these examples are described in Table I below. These compositions are prepared under the general conditions mentioned in Example 1 by adjusting the amounts of monomers and of hydrogen employed.

TABLE I

| Examples | 4 | 5 | 6 | 7 |
| --- | --- | --- | --- | --- |
| Copolymers (A), % by weight | 70 | 70 | 73 | 71 |
| C2, % by weight | 0.6 | 0 | 0.7 | 0 |
| C4, % by weight | 17.5 | 13.8 | 17 | 12.5 |
| Copolymers (B), % by weight | 30 | 30 | 27 | 29 |
| C2, % by weight | 2.6 | 4 | 2 | 7.5 |
| C4, % by weight | 7 | 12 | 4 | 0 |
| MFI | 3 | 2.9 | 2.9 | 3.9 |
| MT (° C.) | 118.2 | 130.4 | 119 | 134 |
| ST (° C.) | 104 | 116 | 109 | 125 |
| HSF (weight %) | 20 | 4.5 | 6.3 | 2.2 |

We claim:

1. Compositions based on propylene polymers (compositions (C)) comprising:

from 68 to 80% by weight of a statistical propylene copolymer (copolymer (A)) which contains from 12 to 20% by weight of units derived from 1-butene and from 0 to 2% by weight of units derived from ethylene, and from 32 to 20% by weight of a statistical propylene copolymer (copolymer (B)) which contains from 3 to 15% by weight of units derived from 1-butene and from 1 to 8% by weight of units derived from ethylene, the composition of the two copolymers (A) and (B) being different.

2. The compositions according to claim 1, comprising:

from 68 to 75% by weight of a copolymer (A) containing from 12 to 15% by weight of monomer units derived from 1-butene and from 0 to 1% by weight of monomer units derived from ethylene, and from 32 to 25% by weight of a copolymer (B) containing from 10 to 15% by weight of monomer units derived from 1-butene and from 2 to 5% by weight of monomer units derived from ethylene.

3. The compositions according to claim 2, exhibiting a melting temperature (MT) such that 125° C.≦MT≦135° C., a soluble fraction (HSF) of at most 5.5% and a sealing temperature (ST) such that 110° C.≦ST≦120° C.

4. The compositions according to claim 1, exhibiting a melt flow index (MFI), measured according to ASTM Standard D 1238 (230° C.; load: 2.16 kg), of 2 to 10 g/10 min.

5. The compositions according to claim 1, exhibiting a soluble fraction (HSF) of less than or equal to 5.5% by weight.

6. A process for the manufacture of the compositions according to claim 1, by melt mixing the copolymers (A) and (B) in an internal or external mixer.

7. A process for the manufacture of the compositions according to claim 1, by successive copolymerizations, the copolymer (A) being synthesized during the first stage and the copolymer (B) being synthesized during the second stage in the presence of the copolymer (A).

8. The process according to claim 7, wherein the two successive copolymerization stages are carried out in the gas phase.

9. The process according to claim 7, wherein the two successive copolymerization stages are carried out in the presence of a catalytic system comprising:

a catalytic solid comprising magnesium, titanium and chlorine as essential components, an organoaluminium compound, an electron-donating compound chosen from aromatic carboxylic acid esters and alkoxysilanes.

10. Multilayer heat-sealable sheets, comprising a sealing layer which is substantially composed of a composition (C) according to claim 1.

11. The multilayer heat-sealable sheets according to claim 10, wherein the base sheet is composed substantially of a crystalline propylene polymer.

12. The multilayer heat-sealable sheets according to claim 10, oriented by drawing.

13. A packaging material based on sheets according to claim 10.

14. A multilayer sheet, formed of a composite comprising a base sheet and a layer comprising the composition (C) of claim 1, wherein the composite is formed by coextrusion and is thereafter biaxially oriented.

15. The multilayer sheet of claim 14, wherein the base sheet comprises crystalline polypropylene.

16. The multilayer sheet of claim 15 wherein the composition (C) exhibits a melting temperature (MT) such that 125° C. is less than or equal to MT is less than or equal to 135° C., a soluble fraction HSF of at most 5.5% and a sealing temperature (ST) such that 110° C. is less than or equal to ST is less than or equal to 120° C.

17. A multilayer sheet comprising a preformed base sheet and an extrudate comprising composition (C) of claim 1 extruded on said base sheet to form a composite which composite is biaxially oriented.

18. The multilayer sheet of claim 17 wherein the base sheet comprises crystalline polypropylene.

19. The multilayer sheet of claim 17 wherein the base sheet comprises crystalline polypropylene.

20. The multilayer sheet of claim 19, wherein the composition (C) exhibits a melting temperature (MT) such that 125° C. is less than or equal to MT is less than or equal to 135° C., a soluble fraction HSF of at most 5.5% and a sealing temperature (ST) such that 110° C. is less than or equal to ST is less than or equal to 120° C.

21. The multilayer sheet of claim 19, wherein the composition (C) exhibits a melting temperature (MT) such that 125° C. is less than or equal to MT is less than or equal to 135° C., a soluble fraction HSF of at most 5.5% and a sealing temperature (ST) such that 110° C. is less than or equal to ST is less than or equal to 120° C.

22. A multilayer sheet comprising a base sheet which is monoaxially oriented in the machine direction (MD), wherein a layer of composition (C) of claim 1 is extruded on said base sheet to form a composite, wherein said composite is drawn in the transverse direction (TD).

* * * * *